United States Patent [19]

Maddock

[11] Patent Number: 4,664,147

[45] Date of Patent: May 12, 1987

[54] FLOW REGULATED MIXER-INJECTION SYSTEM

[76] Inventor: Mitchell E. Maddock, 541 W. Coolidge Ave., Coolidge, Ariz. 85228

[21] Appl. No.: 762,853

[22] Filed: Aug. 6, 1985

[51] Int. Cl.[4] .............................................. F16K 19/00

[52] U.S. Cl. ................................ 137/599.1; 137/888; 137/892

[58] Field of Search ...................... 137/892, 599.1, 888

[56] References Cited

U.S. PATENT DOCUMENTS

| | | | |
|---|---|---|---|
| 2,233,965 | 3/1941 | Strovink | 137/892 |
| 2,873,758 | 2/1959 | Nielsen | 137/599.1 X |
| 2,953,160 | 9/1960 | Brazier | 137/892 X |
| 3,595,442 | 7/1971 | Shapiro | 137/892 |

FOREIGN PATENT DOCUMENTS

| | | | |
|---|---|---|---|
| 754890 | 8/1956 | United Kingdom | 137/599.1 |

*Primary Examiner*—Robert G. Nilson

*Attorney, Agent, or Firm*—Richard R. Mybeck

[57] ABSTRACT

A mixer-injector device for introducing incrementally controllable amounts of active chemical reagent into a carrier fluid for delivery to a preselected location. Each device includes means for directing a pressurized carrier fluid thereinto and selectively through an interchangeable catridge coacting with a strategically disposed reagent delivery system to admix a predetermined amount of the chemical reagent therewith in response to pressure control means operatively associated therewith.

14 Claims, 6 Drawing Figures

FLOW REGULATED MIXER-INJECTION SYSTEM

INTRODUCTION

Many present day businesses require efficient means and methods for the controlled injection of preselected reagents into a pressurized fluid delivery system. For instance, today's agri-business requires such means and methods for the controlled injection of fertilizers, insecticides, herbicides and the like into a carrier stream to enhance soil fertility or prevent insects, weeds or grass fungus formation. Other businesses need such means and methods to disperse other useful compounds such as detergents, bleaches, corrosion resistors and wetting agents. Home owners also need efficient and economical means and methods to treat their surrounding landscape without the danger of over or under treating for a specific result. The present invention is directed to such means and methods.

BACKGROUND OF INVENTION

The use of potent and expensive chemicals for the control of molds, bacteria, insects, undesirable vegatation, soil fertility, corrosion, algae and the like has been known for years. Early methods of applying such chemicals relied on the sprinkling of powders or granules to control the amount of chemical delivered to the desired site. Later inactive diluents were used to dissolve and thereafter deliver the reagent. While somewhat effective, the distribution of solid chemical or dissolved chemical was not cost effective because some areas received too much and other areas received too little of the active ingredient.

With the advent of liquid pumping systems, it became possible to mix the active chemical with water. The water solution or suspension could be distributed by spraying the area to be treated. However, thorough mixing of active chemical into the carrier stream still posed a problem because even a small error in measurement or insufficient mixing could cause over or under treatment and frustrate the desired effects.

As previously stated, the use of liquid dispersal systems was somewhat effective, allowing for the difficulty in accurate mixing and brought the incorporation of venturi tubes within the carrier stream path as shown in U.S. Pat. No. 4,123,800, Mazzei. While Mazzei somewhat alleviated the mixing problem, the device did not permit the vaccum created thereby to be controlled with the end result that the mixer either operated at its optimum or it did not operate at all.

Thus the art as developed is unable to precisely and incrementally meter chemical additives into a flowing carrier stream. It is toward the solution of that problem that the present invention is directed.

SUMMARY OF INVENTION

The present invention comprises a corrosion resistant variable carrier flow device having interchangeable mixer-injection cylinders or cartridges which coact with a vacuum by-pass control to supply and thoroughly mix incrementally precise amounts of active treatment chemicals into a carrier fluid to comply with exacting field application requirements.

More particularly, the present invention allows a lay person to obtain the precise injection of active chemical into a carrier stream with an accuracy heretofore not obtainable even by experts. In principle, the device permits sanitizing agents, insecticides, weed control compounds, herbicides, fertilizers, and like chemical reagents to be delivered via a dispersable carrier fluid such as water, to a preselected location. The dilution rate of the active chemical within the carrier can be carefully controlled simply by adjusting inlet and outlet carrier pressures, through the coordination of interchangable venturi-like cartridges with an interrelated bypass control so that the unintended over or under treatment found with other methods of chemical dispersion is prevented. By use of the device hereof, economic loss of reagent and inadvertent overtreatment with potentially toxic chemicals can be easily avoided.

Accordingly, a prime object of the present invention is to provide a flow regulated mixer-injection system which is capable of incrementally metering chemical additives into a flowing carrier stream to provide precise concentrations of such chemical additives for delivery to preselected areas.

Another object of the present invention is to provide a new and improved flow-regulator-mixer having interchangeable venturi cartridges coacting with by-pass control means to readily and incrementally control the admixture of chemical additives into a carrier stream for delivery to a preselected area.

A further object of the present invention is to provide an improved mixer-injector device which can be readily incorporated into a carrier stream conduit and produces an incrementally controllable system of introducing preselected additives into the carrier solution.

Still another object of the present invention is to provide a new and improved mixer-injector system in which the correlated parts provide precise control of the introduction of chemical additives into a carrier stream of flow rates of from very small but effective amounts up to as much as 20 gals/hr.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

DESCRIPTION OF PREFERRED EMBODIMENTS

Figure 1:
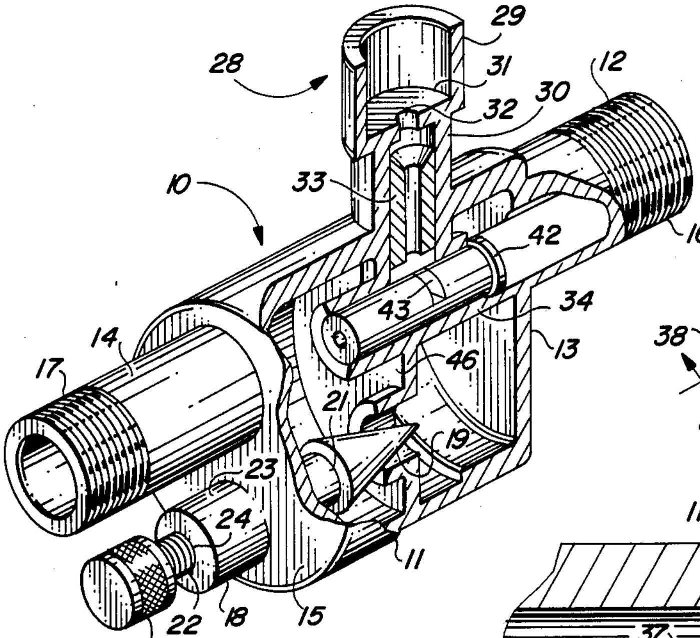
FIG. 1 is an isometric drawing, partially cut away, showing a mixer injection device embodying the present invention.

Referring to FIG. 1, the present invention comprises a mixing distribution device 10, comprising a cylindrical body portion 11 having a carrier inlet pipe 12 extending outwardly from one end plate 13 thereof, a carrier outlet pipe 14 extending outwardly from the other end plate 15 thereof in general axial alignment with pipe 12. Pipe 12 is provided with suitable threads 16 and pipe 14 is provided with suitable threads 17 to permit conventional conduit as hose (not shown) to be readily coupled thereto.

Adjacent outlet pipe 14 and end 15 is positioned a pressure control valve 18 which comprises a conical nose portion 19 and knurled knob 20 having a stem member 21 operatively interposed therebetween having a threaded portion 22 operatively engaged within cylindrical member 23 having a threaded opening 24 therethrough for coaction with threaded stem portion 22 to advance and retract conical nose portion 19 along the axis thereof for a purpose to be hereinafter described in detail.

A reagent delivery assembly 28 is disposed transversely of pipes 12, 14 and intermediate thereof in a generally radial position relative to cylindrical body portion 11. Assembly 28 comprises a cylindrical upper portion 29 and a smaller cylindrical lower portion 30 separated by a seating member 31 having a discrete opening 32 extending therethrough to provide fluid communication between said upper portion 29 and said lower portion 30. In my preferred practice, cylindrical portions 29, 30 will be integrally formed or molded with pipes 12, 14 and cylindrical member 23. A flow directional cylinder 33 is disposed within lower portion 30 to receive reagent flowing through opening 32 and directing that reagent into the interior of body portion 11.

Cylindrical portion 29 may be provided with either a force fit adapted or internally threaded to receive and secure the mouth of an inverted reagent bottle therewithin. This attachment can be modified to conform to the mouth of the specific reagent bottle or, where intermixing is not a problem, a common reagent bottle can be used. As a further alternative (not shown), a flow controller valve of the type shown in my copending application Ser. No. 631,247, may be sealingly inserted into portion 29 to receive therewithin the end of a siphon hose connected thereto at one end and submerged in a container of a chemical reagent at the other.

Figure 3:
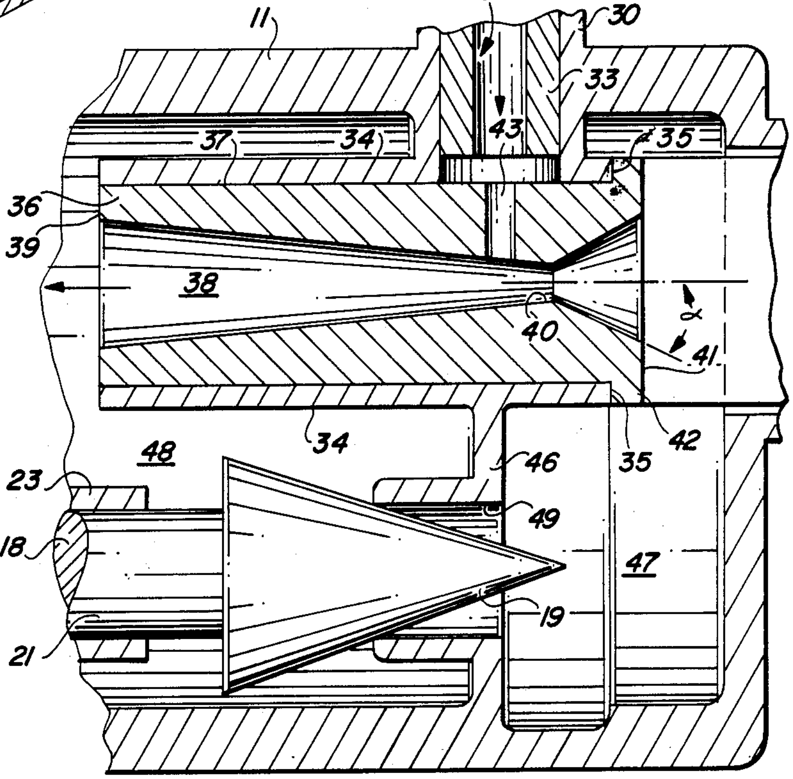
FIG. 3 is the enlarged cross sectional view taken along line 3—3 of FIG. 2, showing the surrounding device.

As shown in FIG. 1 and in FIG. 3, lower portion 30 of reagent delivery assembly 28 depends into the interior of body portion 11 in communicative relationship with a transversely extending generally cylindrical member 34 integrally formed therewith and disposed substantially along the longitudinal axis of pipes 12, 14 and presenting an end surface 35. Thus constructed, member 34 provides a saddle for an interchangeable cartridge 36 which will now be described.

Figure 2:
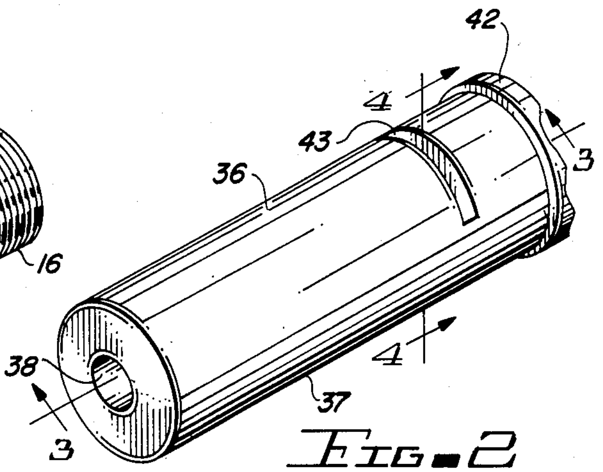
FIG. 2 is an enlarged showing of an interchangeable cylindrical mixer cartridge in accordance with the present invention.
Figure 4:
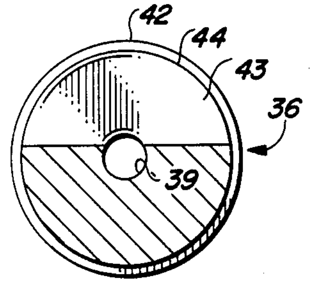
FIG. 4 is a cross section along line 4—4 of FIG. 2.

As previously suggested, the present invention includes a plurality of interchangeable cartridges 36 each of which comprises a cylindrical body portion 37 having a central passage 38 therethrough which tapers inwardly from a larger diameter at the lead end 39 thereof axially therealong into a strategically disposed throat 40 and thence outwardly again to a larger diameter at the tail end 41. In my preferred embodiment, the taper inwardly from 41 to the throat will be approximately 24° with the center line of passageway 38. Throat 40 is deliberately disposed upstream of the reagent delivery system entry port as will appear. An enlarged flange member 42 is disposed at and adjacent tail end 41 and coacts with end surface 35 of cylinder 34 to precisely locate cartridge 36 relative to reagent delivery assembly 28 and, as will appear, to facilitate the placement of cartridge 36 within saddle 34. Each cartridge 36 is provided with a slot 43 in spaced generally parallel relationship to flange member 42 (see FIGS. 2, 3, and 4) so that when flange member 42 is placed in secure abutting relationship with end surface 35, slot 43 is disposed in operative communication with flow directing cylinder 33 to receive reagent therefrom and deliver it into central passage 38 in spaced leading or downstream relationship to throat 40.

Reverting to body portion 11, a central plate 46 is formed therewithin which essentially divides the interior compartment thereof into a first and second chamber 47, 48 respectively. Plate 46 further includes transverse cylindrical cartridge saddle 34 in the location described and a second circular passageway 49 which is disposed through plate 46 therebeneath in substantial axial alignment with pressure control valve 18 to receive conical nose portion 19 therewithin and provide a readily controlled flow of carrier fluid through passageway 49 in response to the axial adjustment of nose portion 19 and the resultant variation of available area for flow created in passageway 49.

Figure 5:
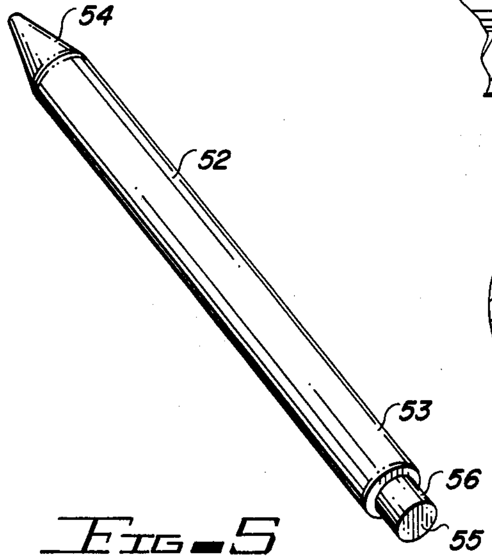
FIG. 5 is an isometric showing of a drift pin tool embodying another aspect of the present invention.
Figure 6:
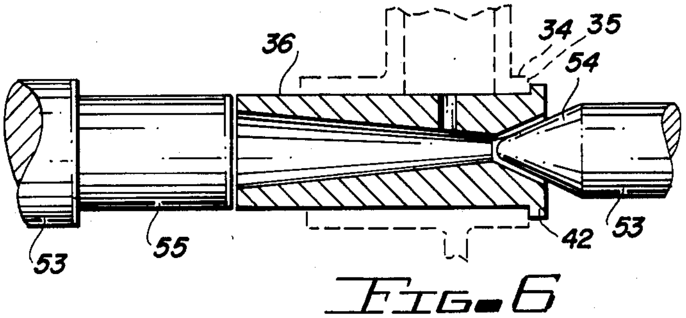
FIG. 6 is an enlarged cross-sectional view of the interchangeable cylindrical mixer cartridge demonstrating its emplacement and removal in accordance with the present invention.

A simple tool 52 has been devised comprising an elongated body portion 53 having a tapered conical projection 54 on one end thereof and a blunt end 55 on the other end thereof. As shown in FIGS. 5 and 6, removable cartridge 36 is mounted in saddle 34 by inserting the conical projection 54 of tool 52 through cylindrical flange 42 into passageway 38 from the tail end 41 thereof and then directing the cartridge 36 therewith through pipe 12 into seating engagement in saddle 34, care being taken to orient slot 43 so that its uppermost point 44 is directed substantially at the center line of cylindrical member 30 and that flange member 42 engages surface 35. Thus positioned, tool 52 is readily removed and the desired cartridge 36 is ready for use. In operation, the presence of the carrier fluid entering pipe 12 and impinging on the exposed end 41 of cartridge 36 will maintain the cartridge firmly in place. It will be noted that optimum benefit of tool 52 is obtained when the contour of conical end 54 substantially conforms to the conical conformation of passage 38 adjacent tail end 41.

To remove cartridge 36 for replacement with another of the interchangeable cartridges, tool 52 is reversed to expose its blunt end 55 to cartridge 36, blunt end 55 being disposed at the end of cylindrical neck portion 56 which is defined on body portion 53 remote from conical end 54 and has an outside diameter substantially equal but not greater than the inside diameter of cartridge saddle 34, and the blunt end 55 is inserted through outlet pipe 14 into substantially registered engagement with lead surface 39 and upon the application of slight pressure thereto, cartridge 36 is dislodged from within cylindrical saddle 34 and pushed out of pipe 12. A replacement cartridge is then readily inserted into place using the technique already described.

To operate device 10, a suitable cartridge 36 is installed into saddle 34 and a suitable source of carrier fluid, such as a water hose connected to an appropriate water supply, is attached to inlet pipe 12. Similarly, the conduit selected to direct the reagent/carrier stream is connected to outlet pipe 14.

A preliminary flow of carrier fluid is initiated through device 10 in the usual way and the desired pressure differential between inlet and outlet flow is obtained by rotating knob 20 of pressure control valve 18 until the desired differential is achieved by the ultimate position of conical nose portion 19 relative to passageway 49. As is apparent when nose portion 19 completely obstructs passageway 49, the entire thrust of the inlet pressure will pass through the central passage 38 of cartridge 36 while the gradual dislodgement of nose 19 from within the mouth of passageway 49 will create an gradually increasing annulus of flow with the result that a controlled amount of carrier fluid flow is diverted from cartridge 36 with a relative change in the pressure induced therethrough.

When the desired pressure relationships are obtained, the desired reagent is delivered to the reagent delivery assembly 28, for instance, by seating the mouth of an inverted reagent bottle in cylinder 29 whereupon the contents thereof have access to passageway 38 of cartridge 36 by passing through opening 32, flow direction cyinder 33 and slot 43 in response to the suction created by the flow of carrier fluid through passageway 38 of cartridge 36.

The flow of carrier fluid through pipe 12 into and through central passage 38 of cartridge 36 creates a so-called venturi effect and the resulting vacuum or negative pressure is such that the preselected chemical reagent is predictably drawn into passageway 38 for mixture with the carrier fluid and ultimate delivery via outlet pipe 14 to the desired location.

The complete and proportionate mixing of the chemical concentrate is thus achieved by the unique coaction of the carrier fluid pressure, as adjusted by pressure control valve 18, the strategic location of throat 40 within cartridge 36 up stream from the concentrate entry point 44, and the particular cartridge 36 selected for the task at hand.

It has been demonstrated that cartridges having internal throat diameters of 1/16 inch, ⅛ inch and 3/16 inch provide more than adequate variation of reagent concentrations for most commonly occurring needs when operating at a pressure differential of 20% or greater. By pressure differential is meant for example, when the inlet pressure is 100 psi, the outlet pressure should not exceed 80 psi, a 20% difference. Using the interchangeable venturi-like cartridges, it is found that the device is effective at flow rates from as little as 0.5 gallons per minute and can achieve reagent delivery of up to 20 gallons per hour. Other measured values are shown in Table I.

TABLE I

| Throat dia. Inches | Carrier flow gpm | Max Reagent Flow gph |
|---|---|---|
| 0.045 | 0.5 | 4 |
| 0.125 | 1.5 | 10.22 |
| 0.156 | 3.0 | 20 |

To further aid in the understanding of the present invention, and not by way of limitation, the following example is presented to demonstrate the easy and accurate distribution of treatment chemicals or other concentrates to selected sites when a cartridge having a venturi throat of 0.125 inches is used.

| Intake PSI | Exit PSI | GPH Injected |
|---|---|---|
| 50 | 40 | 1.75 |
| 50 | 35 | 6.25 |
| 50 | 30 | 7.5 |
| 50 | 25 | 9.37 |
| 50 | 20 | 10.22 |

-continued

| Intake PSI | Exit PSI | GPH Injected |
|---|---|---|
| 40 | 32 | 1.65 |
| 40 | 25 | 8.03 |
| 40 | 20 | 9.37 |
| 40 | 15 | 10.22 |
| 30 | 24 | 1.60 |
| 30 | 20 | 2.00 |
| 30 | 15 | 8.65 |
| 30 | 10 | 10.22 |
| 25 | 20 | 1.50 |
| 25 | 15 | 5.92 |
| 25 | 10 | 9.37 |
| 25 | 5 | 10.22 |
| 20 | 16 | 1.50 |
| 20 | 10 | 7.03 |
| 20 | 5 | 10.22 |
| 15 | 12 | 1.40 |
| 15 | 10 | 4.32 |
| 15 | 5 | 10.22 |
| 10 | 8 | 1.40 |
| 10 | 5 | 10.22 |
| 5 | 4 | 1.40 |

GPH = Gallons per Hour
PSI = Pounds per Square Inch

From the foregoing, it is apparent that volume measurements of the input chemical concentrate are not necessary when tables such as the above are used relative to the specific cartridge installed. Further, a restricted and measured chemical flow can be used to distribute a finite quantity of chemical without regard to chemical concentration, thereby providing the ideal means of distribution for water carrier treatment systems. Further, the present invention provides significant advantages over the conventional venturi by permitting the total carrier flow to be partially diverted from the venturi in those many instances when the maximum vacuum for which the venturi is designed is neither necessary or desirable. Indeed, when the conventional venturi is operated at maximum suction, considerable flow is lost as a result of the back pressure created thereby. The present device with coaction of its pressure control or by-pass valve enables the operator to choose only the amount of vacuum necessary to achieve the desired mixing and the balance of the carrier fluid is diverted through the by-pass to reduce back pressure and enhance the overall flow of the system.

As previously noted, the preferred form of the present invention finds device 10, excepting cartridge 36, and control valve 18, molded in two integral parts and thereafter assembled on a single mating plane. All portions of the device are preferably formed of a corrosion resistant material such as polypropylene, polyvinyl chloride, nylon, polycarbonate, Teflon® (Trademark DuPont) or the like.

In a preferred installation, when inverted reagent bottles are used, the reagent delivery system will be disposed in an upward position to allow the concentrate to maintain a liqud seal and maximize the effect of the suction created by the venturi-like passage of the cartridge.

Of course, all service piping or conduits employed herewith shall be appropriately valved and comply with all regulations governing the use of the chemicals involved. When desired, parallel inlet and outlet pressure gauges can be installed to visually verify the relative pressure settings and differentials.

From the foregoing it is readily apparent that the device herein described and illustrated achieves all of the foregoing objectives in a remarkably unexpected manner. It is of course understood that such modification, adaptation and alteration as may readily occur to the artisan when confronted by this disclosure are intended with the spirit of the invention which is limited solely by the scope of the claims appended hereto.

What is claimed is:

1. A mixer injector device for introducing incrementally controllable amounts of an active chemical reagent into a carrier fluid for delivery to a preselected location, said device comprising: a body portion having a generally cylindrical side wall, a first end plate disposed at one end of said cylindrical wall, a second end plate disposed in spaced generally parallel relationship to said first end plate at the opposite end of said cylindrical wall and coacting therewith to define a compartment therewith, a central plate operatively interposed between said first end plate and said second end plate to divide said compartment into a first chamber and a second chamber and defining a cartridge receiving saddle therebetween, said central plate having a flanged circular opening defined therethrough in spaced relationship to said cartridge saddle; carrier fluid inlet means extending through said first end plate for communication between said first chamber and a source of pressurized carrier fluid, said means being axially aligned with said cartridge saddle; carrier fluid outlet means extending through said second end plate in axial alignment with said fluid inlet means for communication between said second chamber and means for directing pressurized carrier fluid to a preselected location; a pressure control valve mounted upon said second end plate and extending therethrough in axial alignment with said flanged opening, said control valve having a threaded stem member operatively inserted through said second end plate and having a conical nose member on the distal end thereof, said stem being actuatable relative to said second end plate to advance and retract said conical nose member into and out of said flanged circular opening to control the passage of carrier fluid therethrough; a reagent delivery assembly having a cylindrical upper portion, a cylindrical lower portion disposed beneath said upper portion, seating member operatively interposed between said upper portion and said lower portion and having a passageway therethrough to permit communication therebetween, said lower portion extending into said compartment and merging with said cartridge receiving saddle, and a flow direction cylinder having an axial opening defined therethrough and disposed within said lower cylindrical portion to interconnect said passageway in said seating member with said cartridge receiving saddle; a removable cartridge having a cylindrical body portion having a proximal and a distal end and an axially extending passage defined therebetween, an outreaching flange portion integrally formed with said body portion at the proximal end thereof and having a diameter sufficiently large than the diameter of said cartridge to permit said flange portion to integrally engage said cartridge receiving saddle in abutting relationship thereto in response to the flow of pressurized carrier fluid thereagainst, said cartridge having a semi-circular slot defined transversely therein in the upper portion thereof to establish fluid communication between said flow directional cylinder and said central passage of said cartridge, said passageway including a throat therein defined thereby and having a first diameter at each end thereof, said passageway converging to a second smaller diameter defining said throat in said passageway upstream of said slot.

2. A mixer-injector device for introducing incrementally controllable amounts of an active chemical reagent into a carrier fluid for delivery to a preselected location, said device comprising (a) a body portion, having means operatively associated therewith for directing a pressurized carrier fluid thereinto and therefrom and a cartridge receiving saddle disposed therewithin in axial alignment with said means for directing a pressurized carrier fluid thereinto and therefrom;

(b) reagent delivery means for controlling an active chemical reagent and operatively associated with said body portion and responsive to the pressure of said carrier fluid to introduce active chemical reagent thereinto;

(c) a cartridge member disposed within said body portion in axial alignment with said means for directing pressurized carrier fluid thereinto and therefrom and in radial communication with said reagent delivery means and operative to direct said fluid therethrough while mixing active reagent therewithin; said cartridge member having a cylindrical body portion having a proximal end and a distal end and an axially extending passage extending therebetween, an outreaching flange portion integrally formed with said body portion at the proximal end thereof, said flange portion having a diameter sufficiently larger than the diameter of said cartridge to permit said flange portion to engage said cartridge receiving saddle in response to the flow of pressurized carrier fluid therethrough, said cartridge member including means defined therein in communicative relationship between said axially extending passage and said reagent delivery means, said communicative means comprising a semi-circular slot defined transversely in said cylindrical body portion in facing relationship to said reagent delivery means to establish fluid communication between said reagent delivery means and said axially extending passage, said passage including a throat therein defined thereby and having a first diameter at each end thereof, said passage converging to a second smaller diameter defining said throat in a said passage upstream of said semicircular slot; and (d) pressure control means associated with said body portion and operative to divert preselected amount of said pressurized carrier fluid away from said cartridge to create and regulate suction in said cartridge to incrementalize the amount of active reagent delivered into said carrier fluid from said reagent delivery means and optimize the total flow of impregnated carrier fluid through said body portion.

3. A mixer-injector device for introducing incrementally controllable amounts of an active chemical reagent into a carrier fluid for delivery to a preselected location, said device comprising:

(a) a body portion having means operatively associated therewith for directing a pressurized carrier fluid thereinto and therefrom, said body portion having a generally cylindrical side wall, a first end plate disposed at one end of said cylindrical wall, a second end plate disposed in spaced generally parallel relationship to said first end plate at the opposite end of said cylindrical wall and coacting therewith to define a compartment therewith, a central plate operatively interposed between said first end plate and said second end plate to divide said compartment into a first chamber and a second chamber and defining a cartridge receiving saddle therebetween; carrier fluid inlet means extending through said first end plate for communication between said first chamber and a source of pressurized carrier fluid, said inlet means being axially aligned with said cartridge receiving saddle; carrier fluid outlet means extending through said second end plate for communication between said second chamber and conduit means for directing pressurized carrier fluid to a preselected location, said fluid outlet means being axially aligned with said inlet means; a flanged circular opening defined through said central plate in spaced relationship to said cartridge receiving saddle and communicating between said first and said second chamber; a pressure control valve mounted upon said second end plate and extending therethrough in axial alignment with said flanged opening, said control valve being operative to control the passage of carrier fluid through said flanged opening to create and regulate suction induced in response thereto;

(b) reagent delivery means for containing an active chemical reagent and operatively associated with said body portion and responsive to the pressure of said carrier fluid to introduce active chemical reagent thereinto;

(c) a cartridge member disposed in said cartridge receiving saddle in axial alignment with said inlet means and in radial communication with said reagent delivery means, said cartridge member being operative to direct said fluid therethrough while mixing active reagent therewithin; and (d) pressure control means associated with said body portion and operative to divert preselected amount of said pressurized carrier fluid away from said cartridge to regulate the suction created in said cartridge incrementalize the amount of active reagent delivered into said carrier fluid, and optimize the total flow of impregnated carrier fluid through said body portion.

4. A mixer-injector device according to claim 3 in which said pressure control valve has a manually operated threaded stem member extending through said second end plate and having a conical nose member attached to the distal end thereof in registrable relationship to said flanged opening, said stem being actuatable to advance and retract said conical nose member to control the passage of carrier fluid through said opening.

5. A mixer-injector device according to claim 4 in which said reagent delivery means comprises a cylindrical upper portion, a cylindrical lower portion disposed beneath said upper portion, a seating member operatively interposed between said upper portion and said lower portion and having a passageway defined therethrough to permit communication therebetween, said lower portion extending into said body portion into supporting relationship with said cartridge receiving saddle, and a flow direction cylinder disposed within said lower cylindrical portion having an axial opening defined therethrough to interconnect said passageway in said seating member with said cartridge receiving saddle.

6. A mixer-injector device according to claim 3 in which said reagent delivery means comprises a cylindrical upper portion, a cylindrical lower portion disposed beneath said upper portion, a seating member operatively interposed between said upper portion and said lower portion and having a passageway defined therethrough to permit communication therebetween, said lower portion extending into said body portion in supporting relationship with said cartridge receiving saddle, and a flow direction cylinder disposed within said lower cylindrical portion having an axial opening defined therethrough to interconnect said passagway in said seating member with said cartridge receiving saddle.

7. A mixer-injector device according to claim 3 in which said cartridge receiving saddle is disposed within said body portion in axial alignment with said means for directing a pressurized carrier fluid thereinto and therefrom.

8. A mixer-injector device according to claim 4 in which said cartridge member comprises a cylindrical body portion having a proximal and a distal end and axially extending passage defined therebetween, an outreaching flange portion integrally formed with said body portion at the proximal end thereof and having a diameter sufficiently larger than the diameter of said cartridge to permit said flange portion to integrally engage said cartridge receiving saddle in abutting relationship thereto in response to the flow of pressurized carrier fluid thereagainst, said cartridge including means defined therein in communicative relationship between the passage thereof and said reagent delivery means.

9. A mixture-injector device according to claim 8 in which said communicative means defined in said cartridge comprises a semi-circular slot defined transversely therein in the upper portion thereof to establish fluid communication between said flow directional cylinder and said central passage of said cartridge, said passageway including a throat therein defined thereby and having a first diameter at each end thereof, said passageway converging to a second smaller diameter defining said throat in a said passageway upstream of said slot.

10. A mixer-injector device according to claim 9 in which said pressure control valve has a manually operated threaded stem member extending through said second end plate and having conical nose member attached to the distal end thereof in registrable relationship to said flanged opening, said stem being actuatable to advance and retract said conical opening to control the passage of carrier fluid through said flanged opening.

11. A mixer-injector device according to claim 5 in which said cartridge receiving saddle is disposed within said body portion in axial alignment with said means for directing a pressurized carrier fluid thereinto and therefrom.

12. A mixer-injector device according to claim 11 in which said cartridge member comprises a cylindrical body portion having a proximal and a distal end and axially extending passage defined therebetween, an outreaching flange portion integrally formed with said body portion at the proximal end thereof and having a diameter sufficiently larger than the diameter of said cartridge to permit said flange portion to integrally engage said cartridge receiving saddle in abutting relationship thereto in response to the flow of pressurized carrier fluid thereagainst, said cartridge including means defined therein in communicative relationship between the passage thereof and said reagent delivery means.

13. A mixture-injector device according to claim 12 in which said communicative means defined in said cartridge comprises a semi-circular slot defined transversely therein in the upper portion thereof to establish fluid communication between said flow directional cylinder and said central passage of said cartridge, said passageway including a throat therein defined thereby and having a first diameter at each end thereof, said passageway converging to a second smaller diameter defining said throat in a said passageway upstream of said slot.

14. A mixer-injector device according to claim 13 in which said pressure control valve has a manually operated threaded stem member extending through said second end plate and having a conical nose member attached to the distal end thereof in registrable relationship to said flanged opening, said stem being actuatable to advance and retract said conical nose member to control the passage of carrier fluid through said flanged opening.

* * * * *

UNITED STATES PATENT AND TRADEMARK OFFICE
CERTIFICATE OF CORRECTION

PATENT NO. : 4,664,147

DATED : May 12, 1987

INVENTOR(S) : Mitchell E. Maddock

It is certified that error appears in the above-identified patent and that said Letters Patent are hereby corrected as shown below:

In the Abstract:

line 6, "catridge" should read --- cartridge ---;

In the Specification:

col 1, line 48, "vaccum" should read --- vacuum ---;

In the Claims:

Claim 2, line 11, "controlling" should read --- containing ---;

Signed and Sealed this

Nineteenth Day of July, 1988

*Attest:*

DONALD J. QUIGG

*Attesting Officer*

*Commissioner of Patents and Trademarks*